United States Patent
Bastide et al.

(10) Patent No.: US 11,423,094 B2
(45) Date of Patent: Aug. 23, 2022

(54) DOCUMENT RISK ANALYSIS

(71) Applicant: International Business Machines Corporation, Armonk, NY (US)

(72) Inventors: Paul R. Bastide, Ashland, MA (US); Fang Lu, Billerica, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/896,713

(22) Filed: Jun. 9, 2020

(65) Prior Publication Data
US 2021/0382948 A1     Dec. 9, 2021

(51) Int. Cl.
| | |
|---|---|
| *G06F 16/93* | (2019.01) |
| *G06F 40/117* | (2020.01) |
| *G06F 40/30* | (2020.01) |
| *G06F 16/9535* | (2019.01) |
| *G06N 5/04* | (2006.01) |

(52) U.S. Cl.
CPC .......... *G06F 16/93* (2019.01); *G06F 16/9535* (2019.01); *G06F 40/117* (2020.01); *G06F 40/30* (2020.01); *G06N 5/04* (2013.01)

(58) Field of Classification Search
CPC ...... G06F 40/30; G06F 16/93; G06F 16/9535; G06F 40/117
See application file for complete search history.

(56) References Cited

U.S. PATENT DOCUMENTS

| | | | |
|---|---|---|---|
| 9,110,882 B2 * | 8/2015 | Overell | G06F 40/30 |
| 9,146,913 B2 | 9/2015 | Gorbaty | |
| 9,578,043 B2 * | 2/2017 | Mawji | G06Q 20/384 |
| 9,679,254 B1 * | 6/2017 | Mawji | G06F 21/316 |

(Continued)

OTHER PUBLICATIONS

National Center for Complementary and Integrative Health (NCCIH) "Know the Science: The Facts About Health News Stories"; 4 pages; Apr. 27, 2020; http://web.archive.org/web/20200427090129/ https://www.nccih.nih.gov/health/know-science/facts-health-news-stories (Year: 2020).*

(Continued)

*Primary Examiner* — Benjamin Smith
(74) *Attorney, Agent, or Firm* — Edell, Shapiro & Finnan, LLC

(57) ABSTRACT

A system and method for assessing a potential problem associated with information in a document. In an embodiment, a document for analysis may be received, the document being part of a corpus of one or more documents stored in an electronic format. The document may be analyzed to identify reference(s) in the document, wherein the reference(s) are each selected from the group comprising a natural language statement, a reference in a first part of the document to a second part of the document, or a reference to or from another document. Based on the reference(s), a knowledge graph may be generated to represent information in the document. A risk assessment of a reference in the document may be determined using the knowledge graph. A visual indicator may be applied to the document that emphasizes a potential problem with the reference based on the risk assessment.

17 Claims, 3 Drawing Sheets

(56) References Cited

U.S. PATENT DOCUMENTS

| | | | | |
|---|---|---|---|---|
| 9,721,296 | B1* | 8/2017 | Chrapko | G06N 7/005 |
| 9,892,109 | B2* | 2/2018 | Myslinski | G06F 3/0488 |
| 9,904,962 | B1* | 2/2018 | Bastide | G06F 16/9535 |
| 9,922,134 | B2* | 3/2018 | Chrapko | G06F 16/9024 |
| 9,971,894 | B2 | 5/2018 | Shear et al. | |
| 10,055,466 | B2* | 8/2018 | Trudel | G06Q 30/018 |
| 10,079,732 | B2* | 9/2018 | Chrapko | H04L 45/00 |
| 10,121,115 | B2* | 11/2018 | Chrapko | G06Q 10/0635 |
| 10,162,651 | B1* | 12/2018 | Zhu | G06F 9/453 |
| 10,204,385 | B2* | 2/2019 | Bastide | G06F 40/10 |
| 10,204,386 | B2* | 2/2019 | Bastide | G06F 40/10 |
| 10,331,751 | B2* | 6/2019 | Bhatia | G06F 16/9535 |
| 10,360,643 | B2* | 7/2019 | Bastide | G06Q 50/01 |
| 10,380,703 | B2* | 8/2019 | Chrapko | G06Q 20/4016 |
| 10,521,436 | B2* | 12/2019 | Li | G06F 16/2462 |
| 10,887,177 | B2* | 1/2021 | Chrapko | H04L 45/00 |
| 11,080,485 | B2* | 8/2021 | Toplyn | G06N 3/0445 |
| 11,086,861 | B2* | 8/2021 | Staar | G06F 40/35 |
| 11,087,414 | B2* | 8/2021 | Bastide | G06F 16/9535 |
| 2008/0243825 | A1* | 10/2008 | Staddon | G06F 16/332 |
| 2009/0012842 | A1* | 1/2009 | Srinivasan | G06F 16/3344 707/999.005 |
| 2011/0258021 | A1 | 10/2011 | Mumaw et al. | |
| 2011/0307435 | A1* | 12/2011 | Overell | G06N 20/00 706/46 |
| 2012/0066167 | A1* | 3/2012 | Fokoue | G06N 5/02 706/52 |
| 2013/0159127 | A1* | 6/2013 | Myslinski | G06Q 30/02 705/26.1 |
| 2014/0344241 | A1* | 11/2014 | Hong | G06F 3/04842 707/709 |
| 2015/0293897 | A1* | 10/2015 | Myslinski | G06Q 10/06 707/755 |
| 2016/0070743 | A1* | 3/2016 | Myslinski | G06F 40/284 707/690 |
| 2016/0277424 | A1* | 9/2016 | Mawji | G06Q 50/01 |
| 2016/0371271 | A1* | 12/2016 | Bhatia | G06F 16/9535 |
| 2017/0004129 | A1* | 1/2017 | Shalaby | G06F 40/242 |
| 2017/0206269 | A1* | 7/2017 | Chrapko | G06Q 40/02 |
| 2017/0249315 | A1* | 8/2017 | Mawji | G06F 16/24578 |
| 2017/0293873 | A1* | 10/2017 | Chrapko | G06Q 40/08 |
| 2017/0301038 | A1* | 10/2017 | Mawji | G06Q 20/4016 |
| 2017/0358027 | A1* | 12/2017 | Chrapko | G06F 16/958 |
| 2018/0011856 | A1* | 1/2018 | Li | G16H 50/20 |
| 2018/0101613 | A1* | 4/2018 | Bastide | G06F 16/24578 |
| 2018/0150915 | A1* | 5/2018 | Bastide | G06F 40/10 |
| 2018/0150916 | A1* | 5/2018 | Bastide | G06F 16/9024 |
| 2018/0189410 | A1* | 7/2018 | Bhatia | G06F 16/9535 |
| 2018/0314701 | A1* | 11/2018 | Trudel | G06Q 30/0282 |
| 2018/0337829 | A1* | 11/2018 | Chrapko | H04L 41/12 |
| 2018/0373699 | A1* | 12/2018 | McAteer | G06F 16/9024 |
| 2018/0373701 | A1* | 12/2018 | McAteer | G06F 16/9024 |
| 2019/0026667 | A1* | 1/2019 | Chrapko | G06N 20/00 |
| 2019/0042988 | A1* | 2/2019 | Brown | G06N 5/022 |
| 2019/0213407 | A1* | 7/2019 | Toivanen | G06N 3/0445 |
| 2019/0295188 | A1* | 9/2019 | Bastide | G06Q 50/01 |
| 2019/0361961 | A1* | 11/2019 | Zambre | G06N 3/08 |
| 2019/0378219 | A1* | 12/2019 | Chrapko | G06Q 20/4016 |
| 2020/0004882 | A1* | 1/2020 | Kulkarni | G06F 16/9535 |
| 2020/0218779 | A1* | 7/2020 | Stevens | G06N 5/022 |
| 2020/0242349 | A1* | 7/2020 | Ferreira Moreno | G06V 30/18171 |
| 2020/0257850 | A1* | 8/2020 | Carbune | G06F 40/216 |
| 2020/0279336 | A1* | 9/2020 | Chrapko | G06Q 50/01 |
| 2020/0401590 | A1* | 12/2020 | Staar | G06F 16/24522 |
| 2021/0097178 | A1* | 4/2021 | Bottaro | G06F 40/216 |
| 2021/0142117 | A1* | 5/2021 | Chen | G06K 9/4628 |
| 2021/0217504 | A1* | 7/2021 | Fang | G16H 40/63 |
| 2021/0232608 | A1* | 7/2021 | Chrapko | G06F 16/288 |
| 2021/0279303 | A1* | 9/2021 | Jang | G06F 8/74 |
| 2021/0279599 | A1* | 9/2021 | Carbune | G06F 16/9024 |
| 2021/0287303 | A9* | 9/2021 | Chrapko | G06F 16/288 |

OTHER PUBLICATIONS

National Center for Complementary and Integrative Health (NCCIH) "Finding and Evaluating Online Resources"; 6 pages; Apr. 16, 2020; http://web.archive.org/web/20200416132355/https://www.nccih.nih.gov/health/finding-and-evaluating-online-resources (Year: 2020).*

M.J. Epstein, et al., "The Reporting of Organizational Risks for Internal and External Decision-Making", Management Accounting Guideline, CMA Canada, 2006, ISBN 0-87051-655-8, 46 pages.

IB Learner Profile, "Assessment Principles and Practices—Quality assessments in a digital age", International Baccalaureate, 2018, https://www.google.com/url?sa=t&rct=j&q=&esrc=s&source=web&cd=1&ved=2ahUKEwiiysih_eLnAhVxn-AKHXTpBloQFjAAegQIBRAB&url=https%3A%2F%2Fwww.ibo.org%2Fcontentassets%2F1cdf850e366447e99b5a862aab622883%2Fassessment-principles-and-practices-2018-en.pdf&usg=AOvVaw1JugkOV6L1_QcYisZOQYW6, 268 pages.

Disclosed Anonymously, "Comprehensive Continuous Risk Assessment Process", IPCOM000158836D, https://ip.com/IPCOM/000158836, Oct. 1, 2007, 16 pages.

Disclosed Anonymously, "Simultaneous Expert, Project, and Document Search using Knowledge Graph", IPCOM000242152D, https://ip.com/IPCOM/000242152, Jun. 19, 2015, 7 pages.

N. Pasquier, et al., "Discovering Frequent Closed Itemsets for Association Rules", https://www.google.com/url?sa=t&rct=j&q=&esrc=s&source=web&cd=2&cad=rja&uact=8&ved=2ahUKEwju5-KPhOPnAhUsTt8KHUnODkcQFjABegQIARAB&url=http%3A%2F%2Fciteseerx.ist.psu.edu%2Fviewdoc%2Fdownload%3Fdoi%3D10.1.1.37.1102%26rep%3Drep1%26type%3Dpdf&usg=AOvVaw3y8E1t74cFBQpYWAbRVjtl, International Conference on Database Theory, Springer, Berlin, Heidelberg, 1999, 19 pages.

Disclosed Anonymously, "An Interactive System for the Automated Workload Discovery, Visualization and Analysis in Complex IT Environments", IPCOM000258375D, https://ip.com/IPCOM/000258375, May 6, 2019, 10 pages.

* cited by examiner

DOCUMENT RISK ANALYSIS

BACKGROUND

1. Technical Field

Present invention embodiments relate to computer systems and methods for assessing potential problems associated with information in a document, and more specifically, to computer systems and methods for assessing potential problems associated with information in a document to present an indicator that emphasizes a potential problem associated with information in a document.

2. Discussion of the Related Art

Documents on various subjects are readily available from a variety of sources, including websites on the Internet. These documents may provide a wide variety in the quality and reliability of information. When documents contain potentially unreliable, risky, or otherwise problematic information, users who consume this information may reach improper conclusions and may make decisions based on the information and/or improper conclusions. For example, a user attempting to understand a subject in a document available in an online medical journal may reach a different understanding of the subject by attempting to understand the subject in a document available in an online technology magazine. Users may make decisions and take actions based on their understanding or interpretation of the information in the document, and the unreliable information may lead to a risk of harm to the users.

SUMMARY

According to one embodiment of the present invention, a method for assessing a potential problem associated with information in a document is provided. The method includes receiving, with a computer, a first document for analysis, the first document being part of a corpus of one or more documents stored in an electronic format. The method includes analyzing, with the computer, the first document to identify one or more references in the first document, wherein the one or more references are each selected from the group comprising a natural language statement, a reference in a first part of the first document to a second part of the first document, or a reference to or from a second document. The method includes generating, with the computer and based on the one or more references, a knowledge graph to represent information in the first document. The method includes determining, with the computer, a risk assessment of a reference in the first document using the knowledge graph. The method includes applying, with the computer, a visual indicator to the first document that emphasizes a potential problem with the reference based on the risk assessment.

BRIEF DESCRIPTION OF THE DRAWINGS

Generally, like reference numerals in the various figures are utilized to designate like components.

DETAILED DESCRIPTION

Present invention embodiments can generate a knowledge graph based on one or more references in a document to represent information in the document and assess potential problems with the information in the documents to reduce risk and avoid confusion when presenting a document.

In an example embodiment, inter-related or intra-related references may be derived from documents, and changes in the inter-related or intra-related references that may create risk may be determined. In an example embodiment, in response to determining such changes in the intra-related or inter-related references, an indicator may be applied to the document to emphasis the risk to a user. In an example embodiment, in response to determining such changes in the inter-related concepts, a labeled reference may be used to block content from decision making systems.

Present invention embodiments may analyze references between documents in a regulated quality management system in order to determine the reliability of the steps that are changing with references to each other and presenting a reliability as part of the possible acceptable change.

Present invention embodiments may implement a reliable reference graph to assert the reliability of the document and references, and may take into account versions and integrity across delivery methods.

Present invention embodiments may determine relationships between information in documents and manage the integrity of the relationships in a quality management system.

Present invention embodiments may analyze document risks by loading a document into a data processing engine, parsing the document for references, calculating a risk based on the references, labeling references with indications of risk, and presenting the document with the labeled references.

Figure 1:
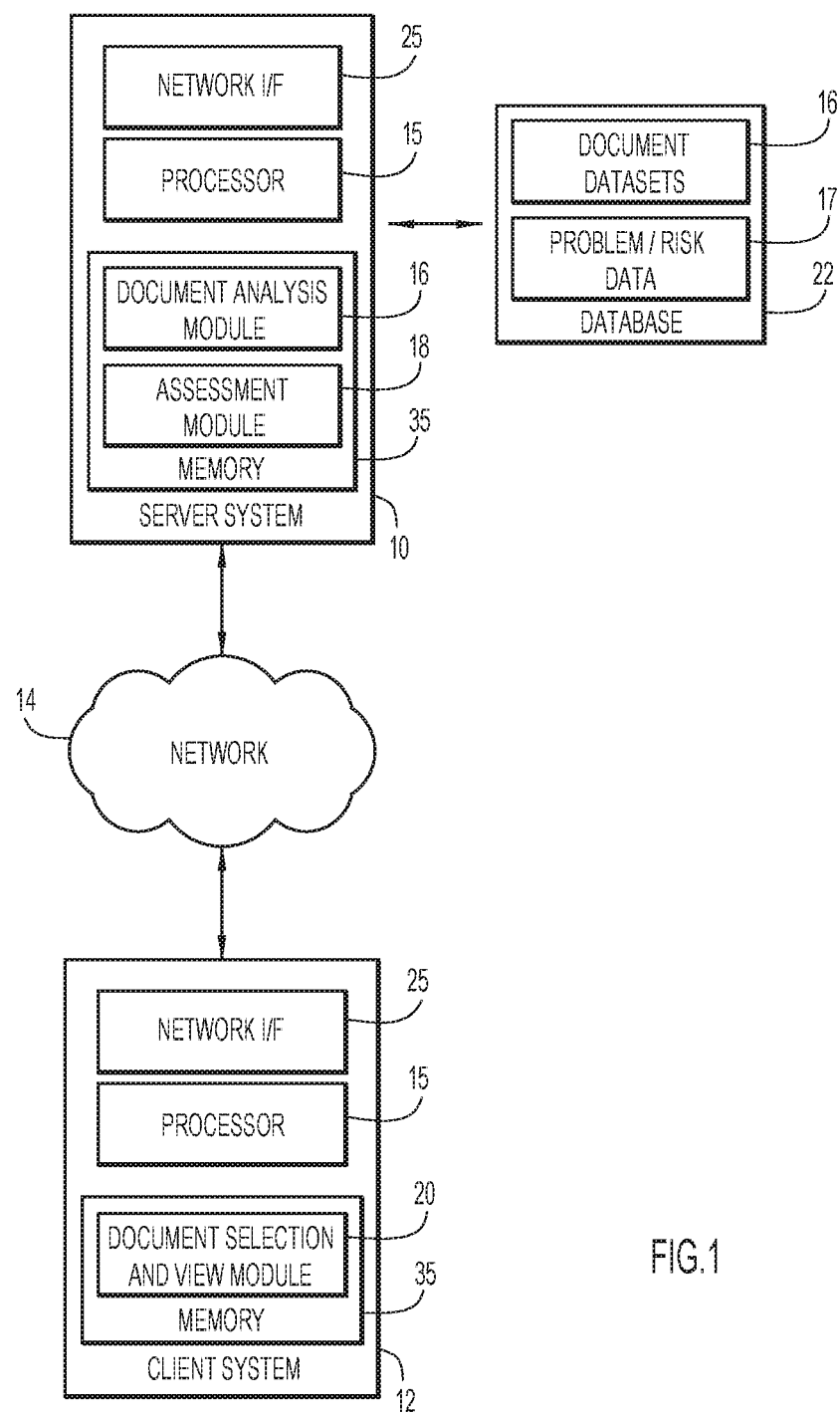
FIG. 1 is a diagrammatic illustration of an example computing environment according to an embodiment of the present invention.

An example environment for use with present invention embodiments is illustrated in FIG. 1. Specifically, the environment includes one or more server systems 10, and one or more client or end-user systems 12. Server systems 10 and client systems 12 may be remote from each other and communicate over a network 14. The network may be implemented by any number of any suitable communications media (e.g., wide area network (WAN), local area network (LAN), Internet, Intranet, etc.). Alternatively, server systems 10 and client systems 12 may be local to each other, and communicate via any appropriate local communication medium (e.g., local area network (LAN), hardwire, wireless link, Intranet, etc.).

In an example embodiment, one or more server systems 10 may include a document analysis module (data processing engine) 16 to analyze a document for one or more references in the document, and an assessment module 17 to assess problems/risks of references in documents and apply indicators based on the assessments. The references may be one or more of a natural language statement, a reference in a first part of the document to a second part of the document, or a reference to or from another document. The document analysis module 16 may parse the document for references and extract the references for use in generating a knowledge graph. For example, the document analysis module 16 may extract references to other parts of a document or to another document from footnotes, endnotes, and/or bibliographies. The analysis of the document for one or more references in the document may result in the identification of one or more references in the document. The one or more references may be used to form edges (also known as lines or links) in a knowledge graph. The nodes (also known as vertices) of the knowledge graph may be the documents of the corpus, and the edges may connect some of the nodes. For example, the edges may include free text citation data (e.g., text that is italicized, indented, and/or quoted) or a hash of a citation. For example, the citation data may include a title, data, author, publisher, version, page numbers, and/or paragraph numbers. The citation data may be hashed using a hashing algorithm, such as, for example, SHA-256. It is to be understood that the disclosure is not limited to SHA-256 and any suitable hashing algorithm may be used. The value of the SHA-256 hash may serve as the edge. Referenced text (e.g., a paragraph surrounding the citation) may be put into an array. The array may be used to capture multi-use citations.

For example, the document analysis module 16 may extract natural language statements using sentence, paragraph, page, and viewable scopes (e.g., portions of the document viewable by a user via a user interface). These scopes may be used to select text and multimedia in the document. The statements may be processed using, e.g., stems, lemmatization, etc., and may be put into a parse tree to simplify lookup.

The document analysis module 16 may apply natural language processing to the document to identify references. For example, the document analysis module 16 may parse the document, using natural language processing techniques, into a series of n-grams or natural language artifacts. The document analysis module 16 may determine the references between the document and the other documents of the corpus. For example, the n-grams or natural language artifacts corresponding to a document may be analyzed for references to other documents of the corpus or other portions of the same document.

In an example embodiment, references may be inter-document or intra-document. For example, an inter-document reference may be a quote in a document of another document. As another example, an inter-document reference may be a negative sentiment (e.g., a first document refuting some or all of a second document) or positive sentiment of a document by another document (e.g., a first document supporting some or all of a second document). For example, an intra-document reference may be a reference to a first portion of a document quoting, refuting, or supporting a second portion of the same document.

The document analysis module may inspect the document and extract the natural language in a manner that maintains the intent(s) of the document. The document analysis module 16 may use optical character recognition (OCR) on images in documents to convert the images to usable text.

The document analysis module 16 may process one or more documents into respective analytical modules and build relationships between the documents. For example, to represent information in a document, the document analysis module 16 may construct a knowledge graph from references identified from an analysis of the document(s). Conventional graph theory and graph structures may be applied to construct the knowledge graph. The relationships between documents of the corpus may be extracted and modeled as nodes and edges in a graph. For example, the documents may be parsed to identify references, and the references may be edges that connect nodes, which may be the documents. The sources can be linked and the free text citation data (e.g., italicized, indented, quoted) and bound by free text citation.

In an example embodiment, the document analysis module 16 may use references identified by analyzing the document to construct a knowledge graph representing information in the document. Documents may be re-analyzed automatically (e.g., in response to changes to the corpus, such as a document being added to the corpus, removed from the corpus, or modified), periodically (e.g., in accordance with a predetermined), and/or in response to user input. In response to new data arriving, the knowledge graph representing information in a document may be updated.

The assessment module 17 may generate a risk assessment based at least on the references and communicate the results. The assessment module 17 may use the knowledge graph (e.g., generated by the document analysis module 16) to generate a risk assessment for one or more references in the document. For example, for references of the knowledge graph for a document, it may be determined whether the document refutes the reference (negative sentiment) or supports the reference (positive sentiment). The risk assessment may include a risk score, for example, a quantitative value, such as a numerical score, and/or a qualitative value, such as low risk, medium risk, or high risk. A risk score may be generated for one or more references, individually or in combination (e.g., aggregated, weighted, etc.). For example, the risk assessment for one or more references in the document may be determined using audience change, language risk, risk path, and/or visibility weighting. Natural language processing techniques may be employed to estimate audience, language risk, and language sentiment. If the risk score exceeds a risk threshold, then the document may be labeled with a visual indicator that emphasizes the risk.

In an example embodiment, the risk assessment may take into account audience change. For example, to calculate audience change, an audience for each of the document the reference may be identified and compared to determine if there has been a change. In an example, conventional natural language techniques may be employed to estimate audience, which may be used to determine any change in audience. In an example, audience may be indicated by or determined from a source location of a document. For example, a document that is a medical article or in a medical journal may be assigned as having a first audience, and a document that is a personal blog or on a personal blog site may be assigned as having a second audience that is different than the first audience. As such, if a document in a medical journal references a document in a personal blog, then an audience change may be determined to have occurred.

In an example embodiment, the risk assessment may take into account language risk and/or language sentiment. To calculate language risk, for example, a language risk database may be accessed. For example, the assessment module 17 may have access to a language risk database (e.g., problem/risk data 19 of database 22), and words, phrases, actions, and/or other information for use in determining risk associated with information in a document may be assigned or associated with a risk score. The referenced text may be analyzed for risky language, or in other words, for language that may be indicative of risk. The risk language may be modeled, for example, using a hash map or a bag-of-words. The risk language may be stored in, for example, a dictionary, hash map, or bag. Edges in the document may be checked for the citation to see if there is anything in the dictionary (or something similar enough in the dictionary) that would increment the risk score. For example, if a comparison of words, phrases, actions, etc. of the referenced text to the information in the database identifies one or more matches, then the risk score for the document being analyzed may be incremented. For example, "very dangerous," "caution," "very easy," and "very difficult," "high risk," "flood," may each have a risk score assigned or associated with it. An amount or level for which the risk score is incremented may be based on the words, phrases, actions, etc. identified as matches and the risk score associated or assigned to those words, phrases, actions, etc. as identified in the database.

In an example embodiment, the risk assessment may take into account risk path. For example, the documents may be analyzed for loops, references corresponding to steps or a sequence of steps, and/or long composite references from one document to another. For each edge (e.g., citation) in a document being analyzed, it may be determined whether the referenced document also references the document being analyzed. For example, if a first document references a second document, then the second document may be analyzed to determine whether the second document references the first document, and if so, a loop would be formed. Whether or not a reference loop is formed may be taken into account in determining the risk assessment. For example, if a loop is formed, a risk score for the reference may be higher than if no loop exists.

In an example embodiment, the risk assessment may be take into account a visibility weighting of a visible area of the document. For example, the document may be currently being viewed and the area of the document that is visible may be weighted to have a larger effect on the risk assessment than the other areas of the document that are not currently visible. A point in the document that is currently visible or being presented via a user interface may be determined, and a risk may be applied to the visible area of the viewable window to calculate risk based on visibility. A Laplace smoothing may be applied to the visible area, and each natural language statement that is visible may increment the risk score by 1 to more heavily weight these statements.

In an example embodiment, for a reference of a document for which a risk assessment was performed, an indicator that emphasizes a potential problem with the reference may be applied to the document based on the risk assessment. For example, the indicator may be applied to a portion(s) of the document that corresponds to the reference. The portion(s) may be flagged, highlighted, underlined, and/or otherwise visually modified to emphasis a potential problem with the reference based on the risk assessment. For example, particular natural language statements that correspond to a reference that is unreasonably risky may have a visual indicator applied to emphasize the risks.

In an example embodiment, the document and/or the reference may be blacklisted from being returned in results of a search related to the reference. For example, if a user searches the corpus for a medical condition, and the reference in a document to another document is determined to be unreasonably risky (e.g., higher than a risk threshold) with respect to the medical condition, then the document and/or the reference may be blacklisted or excluded from being returned in the search results. In an example embodiment, snippets used in a search result list may be augmented such that the likelihood of risk in a decision made from the data is minimized.

In an example embodiment, client systems 12 may enable users to select documents (e.g., documents to be part of a corpus, documents for analysis, etc.) to be provided to or accessed by server systems 10 to determine relationships between the documents and assess potential problems associated with information in the documents. For example, client systems 12 may be configured to submit a document for analysis and receive a risk assessment and/or an indication of risk of a reference in the document by use of a document selection and view module 20. While a single module 20 is shown, it will be appreciated that the module may include multiple modules or units to perform the various functions of present invention embodiments described herein. The various modules of client system 12 may be implemented by any combination of any quantity of software and/or hardware modules or units, and may reside within memory 35 of the client systems 12 for execution by processor 15 of the client systems 12. Alternatively, a client system 12 may be a thin client, and the module 20 may reside within memory 35 of the server systems 10 for execution by processor 15 of the server systems when accessed by client system 12.

The document to be analyzed and the corpus of documents can be determined in various manners. For example, a user may select some or all of the documents that form the corpus. For example, client systems 12 may enable a user to select, via a user interface communicatively coupled to the client systems 12, documents to make up or form a corpus of documents. A user may select each document to include in a corpus individually. As another example, client systems 12 may enable a user to select, via a user interface communicatively coupled to the client systems 12, a document to be included in a corpus of documents, and one or more documents related to the selected document may be identified (e.g., by the server systems 10 and/or client systems 12) to be included in the corpus of documents. For example, documents may be associated with one or more categories, and in response to a document being selected, documents that are associated with the category(ies) as the selected document may be identified and selected to form a corpus of documents. As another example, client systems 12 may enable a user to select one or more categories (e.g., from a list of categories) and, based on the selected category(ies), documents may be selected to form a corpus of documents. The document for analysis may be, for example, selected for a user as part of a healthcare workflow.

Modules 16 and 17 may be combined into a single module. Alternatively, modules 16 and 17 may be separate as shown, and it will be appreciated that one or more of the modules may each include one or more modules or units to perform the various functions of present invention embodiments described below.

A database system 22 may store various information for the analysis (e.g., document data, for example, including documents, knowledge graphs pertaining to information in documents, problem/risk data, for example, including risk scores, risk models for determining risk scores, etc.). The database system may be implemented by any conventional or other database or storage unit, may be local to or remote from server systems 10 and client systems 12, and may communicate via any appropriate communication medium (e.g., local area network (LAN), wide area network (WAN), Internet, hardwire, wireless link, Intranet, etc.).

The client systems 12 may present a user interface, such as a graphical user interface (GUI) or other interface (e.g., command line prompts, audio prompts, etc.) to solicit information from users pertaining to documents, and may provide assessments including analysis results (e.g., documents with indicators of risk applied to them, risk assessments pertaining to references of documents, knowledge graphs representing information in documents, etc.). Client systems 12 may include various types of user input devices, such as a mouse, a keyboard, a touch pad, a microphone, etc., to accept input from users. The corpus of documents or information that enables the corpus of documents to be identified may be provided to server systems 10.

Server systems 10 and client systems 12 may be implemented by any conventional or other computer systems preferably equipped with a display or monitor, a base (e.g., including at least one hardware processor 15 (e.g., microprocessor, controller, central processing unit (CPU), etc.), one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, module, browser/interface software, etc.).

Alternatively, one or more client systems 12 may analyze documents to determine risk information pertaining to document references when operating as a stand-alone unit. In a stand-alone mode of operation, the client system stores or has access to the data (e.g., document data, problem/risk data, etc.), and includes module to analyze a document for one or more references in the document, to assess problems/risks of references in documents, and to apply indicators based on the assessments analyze documents and. The graphical user (e.g., GUI, etc.) or other interface (e.g., command line prompts, menu screens, etc.) solicits information from a corresponding user pertaining to the desired documents and analysis, and may provide reports including analysis results.

Module may include one or more modules or units to perform the various functions of present invention embodiments described below. The various modules (e.g., 16, 17, and 20) may be implemented by any combination of any quantity of software and/or hardware modules or units, and may reside within memory 35 of the server and/or client systems for execution by processor 15.

Figure 2:
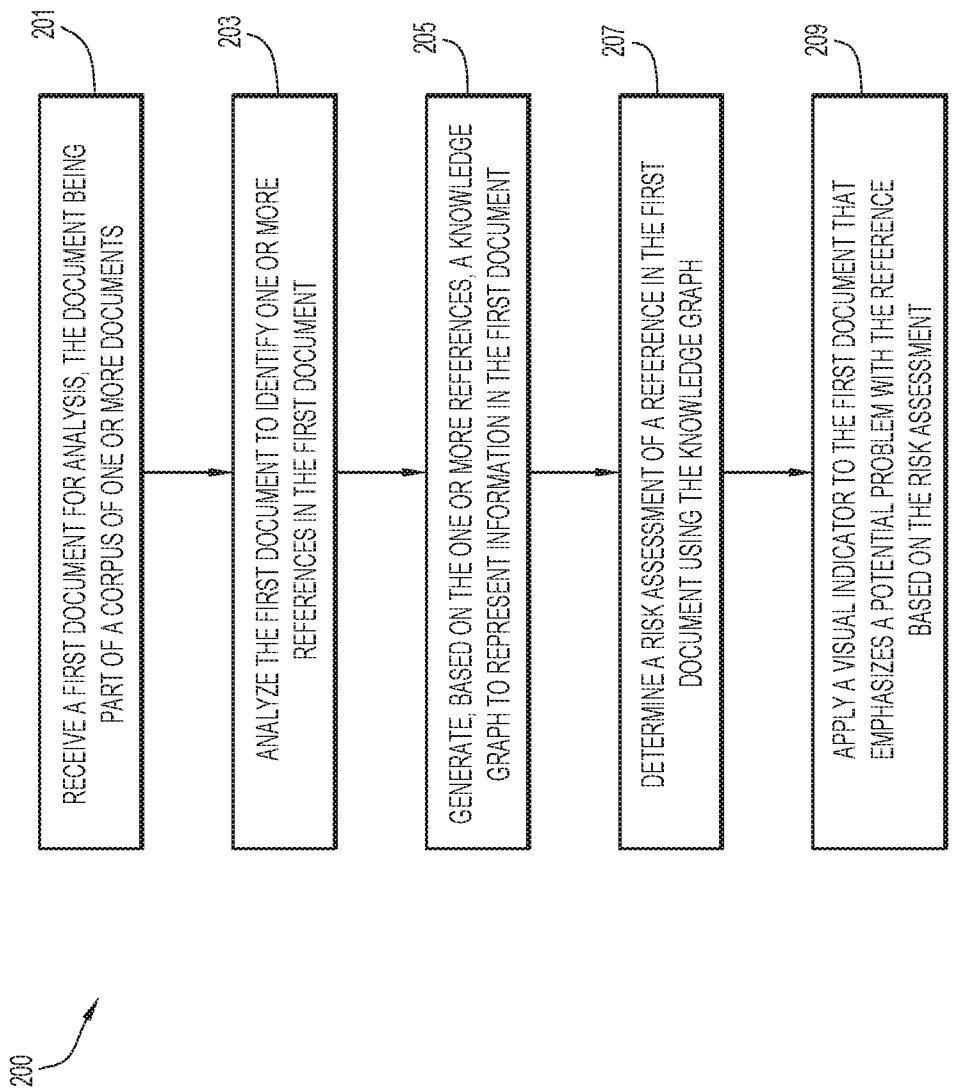
FIG. 2 is a procedural flowchart illustrating a manner of assessing a potential problem associated with information in a document according to an embodiment of the present invention.

FIG. 2 illustrates a method 200 for assessing a potential problem associated with information in a document according to an example embodiment. At step 201, a first document for analysis is received, the first document being part of a corpus of one or more documents stored in an electronic format. For example, a server system (e.g., one or more server systems 10) may be configured to receive a document of a corpus of documents for analysis in response to a client system (e.g., one or more client systems 12) identifying the document and/or the corpus for analysis.

At 203, the first document is analyzed to identify one or more references in the first document. In this embodiment, the one or more references are each selected from the group comprising a natural language statement, a reference in a first part of the first document to a second part of the first document, or a reference to or from a second document.

At 205, based on the one or more references, a knowledge graph is generated to represent information in the first document. For example, server system 10 may generate a knowledge graph from the one or more references to represent information in the first document. For example, footnotes, endnotes, and bibliographies may be identified to determine references.

At 207, a risk assessment of a reference in the first document is determined using the knowledge graph. For example, using the knowledge graph to determine a risk assessment of a reference in the first document may include determining one or more of an audience change, language risk, risk path, and visibility. Incoming and outgoing references may be determined to determine audiences for the first document and references in the first document. If there is a change in audience, then an audience score or audience change score may be incremented or decremented. In an embodiment, determining a risk assessment of a reference of the first document using the knowledge graph may include determining an audience of the first document, determining an audience of the reference, comparing the audience of the first document to the audience of the reference, and assigning a higher risk score to the reference if the audience of the first document and the audience of the reference are the same than if the audience of the first document and the audience of the reference are different. In an embodiment, determining a risk assessment of a reference of the first document by using the knowledge graph may include determining the one or more references includes one or more terms in a language risk database (e.g., problem/risk data 19 of database 22), determining a risk score associated with the one or more terms in the language risk database, and determining the risk assessment of the reference in the first document based on the risk score. In an embodiment, determining a risk assessment of a reference of the first document by using the knowledge graph may include determining a sentiment of the first document with respect to the reference, and determining the risk assessment of the reference based on the sentiment.

At 209, a visual indicator is applied to the first document emphasizing a potential problem with the reference based on the risk assessment. For example, server system 10 may apply the visual indicator. In an embodiment, applying a visual indicator to the first document that emphasizes a potential problem with the reference based on the risk assessment includes applying the visual indicator to a content segment of the first document that corresponds to the reference. The visual indicator may be a label added to or in place of text of the document, highlighting of text, underlining of text, bolding of text, modifying a font style, font type, and/or font size of text. The visual indicator may be selected based on the risk assessment. For example, a color selected for a visual indicator of highlighting of text may be based on the risk assessment, whereas certain color(s) may be indicative of a reference with a risk assessment corresponding to a high or higher risk, and certain color(s) may be indicative of reference with a risk assessment corresponding to a low or lower risk.

In an embodiment, the method may further include blacklisting the first document from being returned in results of a search of the corpus, wherein the search is related to the reference. For example, a user of a client system (e.g., client system 12) may enter one or more search terms related to the reference in to search the corpus, and the first document may be blacklisted from being returned in results of the search. For example, if the risk assessment of the reference in the first document is determined to be problematic or risky (e.g., above an acceptable risk threshold), then the first document and/or the reference may be excluded from being returned in the search results. As another example, if the risk assessment of the reference in the first document is determined to be problematic or risky (e.g., above an acceptable risk threshold), then a visual indicator may be added to the first document and/or the reference if returned in results for a search related to the reference. The visual indicator may emphasize a potential problem with the reference based on the risk assessment.

In an embodiment, the method may further include monitoring a user accessing the first document to identify a focus and determining the risk assessment of the reference based on the focus. For example, a user's focus or visual attention may be determined or estimated using conventional user focus estimation techniques (e.g., gaze tracking, dwell time, etc.). The portion of the first document that the user is focused on may be monitored and used in determining the risk assessment.

Figure 3:
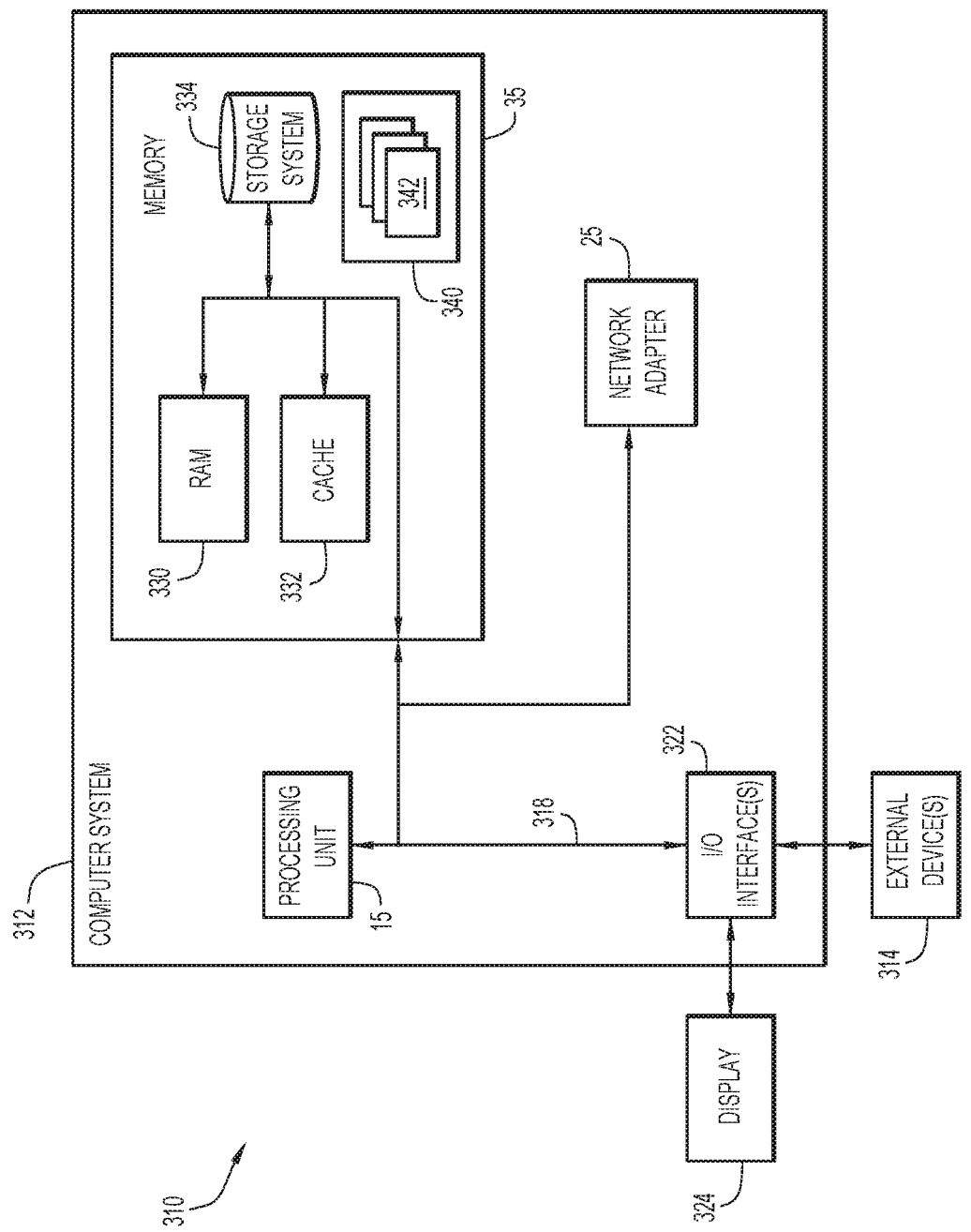
FIG. 3 is a block diagram of an example computing device according to an embodiment of the present invention.

Referring now to FIG. 3, a schematic of an example of a computing device 310 of computing environment 100 (e.g., implementing server system 10 and/or client system 12) is shown. The computing device is only one example of a suitable computing device for computing environment 100 and is not intended to suggest any limitation as to the scope of use or functionality of embodiments of the invention described herein. Regardless, computing device 310 is capable of being implemented and/or performing any of the functionality set forth herein.

In computing device 310, there is a computer system 312 which is operational with numerous other general purpose or special purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 3, computer system 312 is shown in the form of a general-purpose computing device. The components of computer system 312 may include, but are not limited to, one or more processors or processing units 15, a system memory 35, and a bus 318 that couples various system components including system memory 35 to processor 15.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 312 typically includes a variety of computer system readable media. Such media may be any available media that is accessible by computer system 312, and it includes both volatile and non-volatile media, removable and non-removable media.

System memory 35 can include computer system readable media in the form of volatile memory, such as random access memory (RAM) 330 and/or cache memory 332. Computer system 312 may further include other removable/non-removable, volatile/non-volatile computer system storage media. By way of example only, storage system 334 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 35 may include at least one program product having a set (e.g., at least one) of program modules that are configured to carry out the functions of embodiments of the invention.

Program/utility 340, having a set (at least one) of program modules 342 (e.g., modules 16, 17, 20, etc.) may be stored in memory 35 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 25. As depicted, network adapter 25 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

It will be appreciated that the embodiments described above and illustrated in the drawings represent only a few of the many ways of implementing embodiments for document risk analysis.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., modules 16, 17, and/or 20) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., modules 16, 17, and/or 20) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., document data, problem/risk data, etc.). The database system may be implemented by any number of any conventional or other databases, data stores or storage structures (e.g., files, databases, data structures, data or other repositories, etc.) to store information (e.g., document data, problem/risk data, etc.). The database system may be included within or coupled to the server and/or client systems. The database systems and/or storage structures may be remote from or local to the computer or other processing systems, and may store any desired data (e.g., document data, problem/risk data, etc.).

The present invention embodiments may employ any number of any type of user interface (e.g., Graphical User Interface (GUI), command-line, prompt, etc.) for obtaining or providing information (e.g., documents, search results, analysis results, risk assessments, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., documents, search results, analysis results, risk assessments, etc.).

The present invention embodiments are not limited to the specific tasks or algorithms described above, but may be utilized for analyzing problems/risks of references in documents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for assessing a potential problem associated with information in a document, the method comprising:
receiving, with a computer, a first document for analysis, the first document being part of a corpus of one or more documents stored in an electronic format;
analyzing, with the computer, the first document to identify one or more references in the first document, wherein the one or more references are each selected from the group comprising a natural language statement, a reference in a first part of the first document to a second part of the first document, or a reference to or from a second document;
generating, with the computer and based on the one or more references, a knowledge graph to represent information in the first document;
determining, with the computer, a risk assessment of a reference in the first document using the knowledge graph, wherein determining, with the computer, the risk assessment of the reference of the first document using the knowledge graph comprises:
determining an audience of the first document;
determining an audience of the reference, wherein the audience of the first document and the reference are determined according to incoming and outgoing citations of the knowledge graph, wherein the incoming and outgoing citations are indicated in one or more of a footnote, an endnote, and a bibliography of the first document or the reference;
comparing the audience of the first document to the audience of the reference; and
assigning a higher risk score to the reference in response to determining that the audience of the first document and the audience of the reference are the same; and
applying, with the computer, a visual indicator to the first document that emphasizes a potential problem with the reference based on the risk assessment.

2. The method of claim 1, wherein determining, with the computer, a risk assessment of a reference of the first document by using the knowledge graph comprises:
determining the one or more references includes one or more terms in a language risk database;
determining a risk score associated with the one or more terms in the language risk database; and
determining the risk assessment of the reference in the first document based on the risk score.

3. The method of claim 1, further comprising:
monitoring a user accessing the first document to identify a focus; and
determining the risk assessment of the reference based on the focus.

4. The method of 1, further comprising blacklisting, with the computer, the first document from being returned in results of a search of the corpus, wherein the search is related to the reference.

5. The method of claim 1, wherein applying, with the computer, a visual indicator to the first document that emphasizes a potential problem with the reference based on the risk assessment comprises applying the visual indicator to a content segment of the first document that corresponds to the reference.

6. The method of claim 1, wherein the determining, with the computer, a risk assessment of a reference of the first document by using the knowledge graph comprises:
determining a sentiment of the first document with respect to the reference; and
determining the risk assessment of the reference based on the sentiment.

7. The method of claim 1, wherein the reference is related to medical care, and wherein the potential problem is that an instruction related to treating a condition misses a step for treating the condition.

8. A computer program product for assessing a potential problem associated with information in a document, the computer program product comprising one or more computer readable storage media having program instructions collectively stored on the one or more computer readable storage media, the program instructions executable by a processor to cause the processor to:
receive a first document for analysis, the first document being part of a corpus of one or more documents stored in an electronic format;
analyze the first document to identify one or more references in the first document, wherein the one or more references are each selected from the group comprising a natural language statement, a reference in a first part of the first document to a second part of the first document, or a reference to or from a second document;
generate, based on the one or more references, a knowledge graph to represent information in the first document;
determine, a risk assessment of a reference in the first document using the knowledge graph, wherein determining the risk assessment of the reference of the first document using the knowledge graph comprises:
determining an audience of the first document;
determining an audience of the reference, wherein the audience of the first document and the reference are determined according to incoming and outgoing citations of the knowledge graph, wherein the incoming and outgoing citations are indicated in one or more of a footnote, an endnote, and a bibliography of the first document or the reference;
comparing the audience of the first document to the audience of the reference; and assigning a higher risk score to the reference in response to determining that the audience of the first document and the audience of the reference are the same; and
apply a visual indicator to the first document that emphasizes a potential problem with the reference based on the risk assessment.

9. The computer program product of claim 8, wherein the program instructions are executable by a processor to cause the processor to determine a risk assessment of a reference of the first document using the knowledge graph by:
determining the one or more references includes one or more terms in a language risk database;
determining a risk score associated with the one or more terms in the language risk database; and
determining the risk assessment of the reference of the first document based on the risk score.

10. The computer program product of claim 8, wherein the program instructions are executable by a processor to cause the processor to:
monitor a user accessing the first document to identify a focus; and
generate the risk assessment of the reference based on the focus.

11. The computer program product of claim 8, wherein the program instructions are executable by a processor to cause the processor to blacklist the first document from being returned in results of a search of the corpus, wherein the search is related to the reference.

12. The computer program product of claim 8, wherein the program instructions are executable by a processor to cause the processor to apply a visual indicator to the first document that emphasizes a potential problem with the reference based on the risk assessment by applying the visual indicator to a content segment of the first document that corresponds to the reference.

13. The computer program product of claim 8, wherein the reference is related to medical care, and wherein the potential problem is that an instruction related to treating a condition misses a step for treating the condition.

14. A system for assessing a potential problem associated with information in a document, the system comprising:
a processor; and
a computer readable storage medium having program instructions embodied therewith, the program instructions executable by the processor to cause the processor to:

receive, a first document for analysis, the first document being of a corpus of one or more documents stored in an electronic format;

analyze the first document to identify topics, metadata, and one or more references corresponding to a second document in the corpus;

determine, based on the topics, the metadata, and the one or more references corresponding to the second document in the corpus, a dataset to represent information in the first document, wherein determining the risk assessment of the reference of the first document using the knowledge graph comprises:

determining an audience of the first document;

determining an audience of the reference, wherein the audience of the first document and the reference are determined according to incoming and outgoing citations of the knowledge graph, wherein the incoming and outgoing citations are indicated in one or more of a footnote, an endnote, and a bibliography of the first document or the reference;

comparing the audience of the first document to the audience of the reference; and assigning a higher risk score to the reference in response to determining that the audience of the first document and the audience of the reference are the same;

generate a risk assessment of a topic of the first document by evaluating the dataset; and apply a visual indicator to the first document that emphasizes a potential problem with the topic based on the risk assessment.

15. The system of claim 14, wherein the program instructions are executable by the processor to cause the processor to determine the risk assessment of the topic of the first document by:

determining the one or more references includes one or more terms in a language risk database;

determining a risk score associated with the one or more terms in the language risk database; and determining the risk assessment of the reference of the first document based on the risk score.

16. The system of claim 14, wherein the program instructions are executable by the processor to cause the processor to:

monitor a user accessing the first document to identify a focus; and generate the risk assessment of the reference based on the focus.

17. The system of claim 14, wherein the program instructions are executable by the processor to cause the processor to blacklist the first document from being returned in results of a search of the corpus, wherein the search is related to the reference.

* * * * *